(12) United States Patent
Westgate et al.

(10) Patent No.: US 8,341,156 B1
(45) Date of Patent: Dec. 25, 2012

(54) SYSTEM AND METHOD FOR IDENTIFYING ERRONEOUS BUSINESS LISTINGS

(75) Inventors: Diane Barram Westgate, Mountain View, CA (US); Nicholas Lee, Bothell, WA (US); Ethan G. Russell, Jersey City, NJ (US); Paul Eastlund, Mamaroneck, NY (US); Alex Lorbeer, Hoboken, NJ (US); Todd Gardner, New York, NY (US)

(73) Assignee: Google Inc., Mountain View, CA (US)

( * ) Notice: Subject to any disclaimer, the term of this patent is extended or adjusted under 35 U.S.C. 154(b) by 85 days.

(21) Appl. No.: 13/079,416

(22) Filed: Apr. 4, 2011

(51) Int. Cl.
*G06F 7/00* (2006.01)

(52) U.S. Cl. ..................................................... 707/736
(58) Field of Classification Search .................. 707/736
See application file for complete search history.

*Primary Examiner* — Truong Vo
(74) *Attorney, Agent, or Firm* — Lerner, David, Littenberg, Krumholz & Mentlik, LLP

(57) ABSTRACT

A system and method is provided that detect a business listing having erroneous geospatial data. In one aspect, it is determined whether a first location and a second location are at least partially situated within a cell, the cell representing a geographic region having a predetermined area. If the first location and the second location are at least partially situated within the cell, it is determined whether a geospatial coordinate of the first location is within a predetermined radius of the second location. If it is determined that the geospatial coordinate of the first location is within a predetermined radius of the second location, the first location is flagged for inspection.

14 Claims, 8 Drawing Sheets

SYSTEM AND METHOD FOR IDENTIFYING ERRONEOUS BUSINESS LISTINGS

BACKGROUND OF THE INVENTION

Search entities attempt to provide business information to users by displaying business locations on an electronic map. That is, to other individuals or businesses searching for a particular geographic area.

In the past, systems have selected and displayed business listings based on information received from users. Electronic maps may use overlays to target users interested in a particular destination. For example, search entities may display business listings for users viewing an online electronic map of an area in which the business is located or the business' product is available. Thus, an owner of a pizzeria may have a business listing overlaid upon a map centered within some distance of their location. In that regard, businesses are able to reserve their address on a map to have their information displayed to users searching a destination near their location.

While such systems have been widely used, business listings are often mapped erroneously. For example, a pizzeria may be overlaid on the same address as a famous landmark or point of interest like the Empire State Building or the Golden Gate Bridge. This may be due to a data entry error, but it is frequently due to a deliberate attempt by advertisers to promote their business by using the same address as a famous landmark or point of interest.

BRIEF SUMMARY OF THE INVENTION

Aspects of the invention provide systems and methods for identifying erroneous business listings. The method for identifying erroneous business listings may comprise obtaining data indicative of the business listing associated with a first location; determining whether the first location and a second location are at least partially situated within a cell, the cell representing a geographic region having a predetermined area, the second location being associated with a listing of a locality, the listing being recognized as valid; if the first location and the second location are at least partially situated within the cell, determining whether a geospatial coordinate of the first location is within a predetermined radius of the second location; If it is determined that the geospatial coordinate of the first location is within a predetermined radius of the second location, flagging the business listing for inspection. The locality may be a point of interest.

In another aspect of the invention, if it is determined that the geospatial coordinate of the first location is within a predetermined radius of the second location, an alert indicating that erroneous geospatial data may have been found may be rendered on an electronic display.

In a further aspect of the invention, if it is determined that the first location is at least partially located within the geographic region represented by the cell, the first location may be associated with the cell. In yet a further aspect of the invention, if it is determined that the second location is at least partially located within the geographic region represented by the cell, the second location may be associated with the cell. In yet a further aspect of the invention, the predetermined area may correspond with a predetermined level of precision. The cell may be one of a plurality of cells, each of the plurality of cells representing another geographic region whose area corresponds with the predetermined level of precision.

In another aspect of the invention, a system for detecting a business listing having erroneous geospatial data is provided. The system may include a processor, memory for storing business listings data, memory for storing point of interest data, and memory for storing spatial index data. The processor may be coupled to the memory for storing business listings data, the memory for storing point of interest data, and the memory for storing spatial index data. The processor may be configured to obtain data indicative of the business listing associated with a first location; to determine whether the first location and a second location are at least partially situated within a cell, the cell representing a geographic region having a predetermined area, the second location being associated with a listing of a locality, the listing being recognized as valid; if the first location and the second location are at least partially situated within the cell, to determine whether a geospatial coordinate of the first location is within a predetermined radius of the second location; and if it is determined that the geospatial coordinate of the first location is within a predetermined radius of the second location, to flag the first location for inspection.

DETAILED DESCRIPTION

Systems and methods according to one aspect of the invention involve mapping points of interests and business locations to cells that represent areas of a map. The advertisements for the business locations may be associated with geographical target areas. Through a batch process, the systems and methods may determine whether any business addresses intersect or are within a predetermined radius of any public region or point of interest. If any business address intersects or is positioned within a predetermined radius of a public region or point of interest, the business address may be flagged for manual review.

Figure 1:
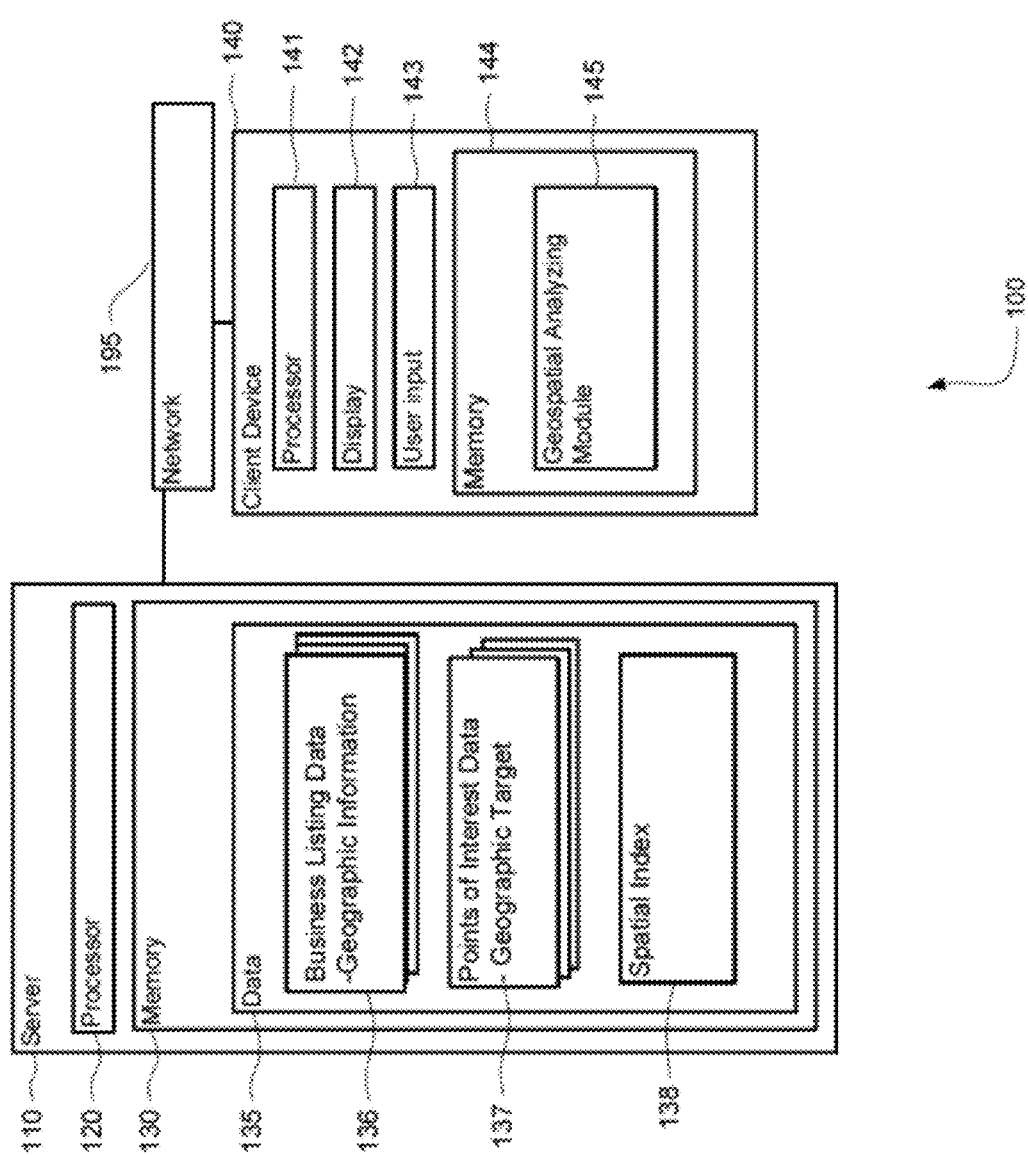
FIG. 1 is a functional diagram of a system in accordance with an aspect of the invention.
Figure 2:
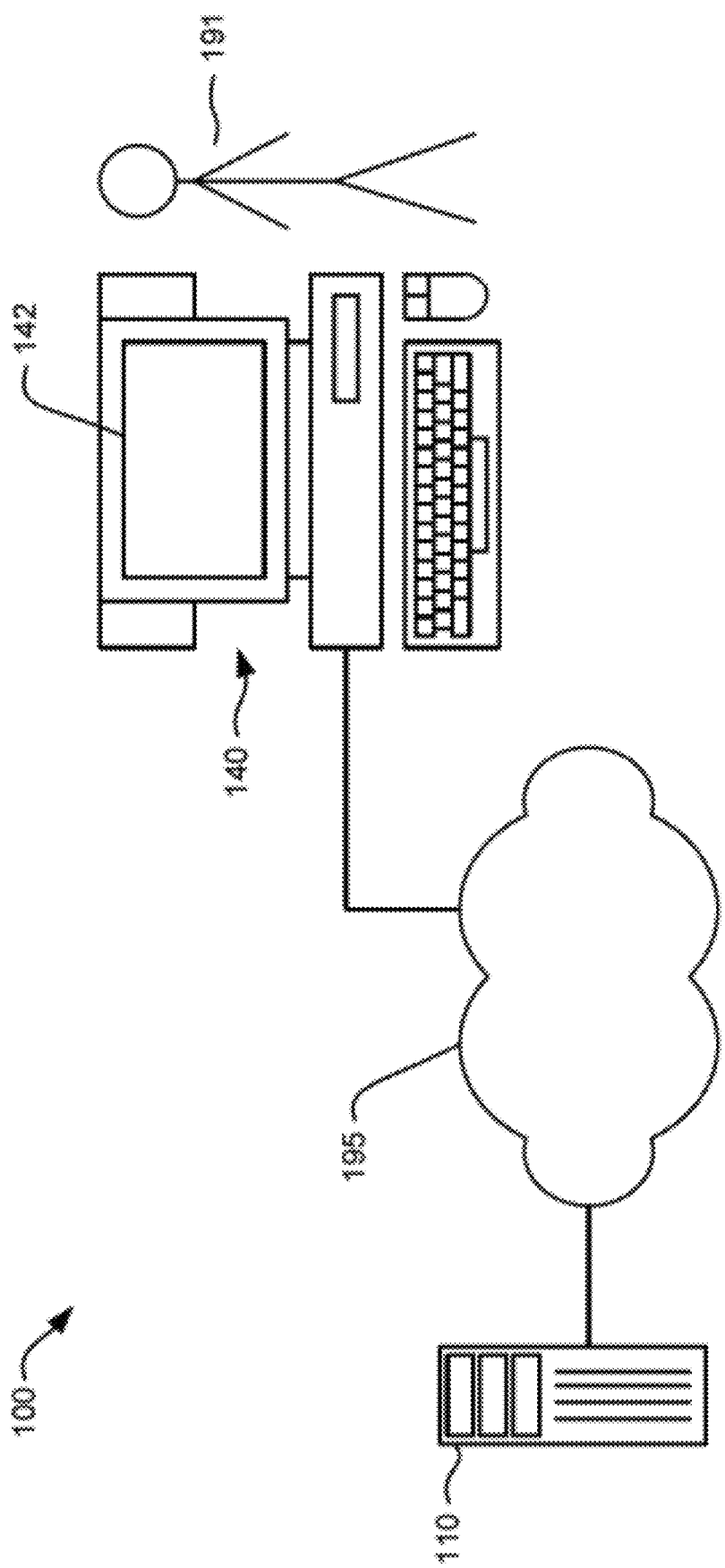
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers. FIGS. 1-2 also illustrate a client device 140 containing a processor 141 and a memory 144.

Memory 144 of client device 140 may store information accessible by processor 141, including a geospatial analyzing module ("GAM") 145 that may contain instructions executable by the processor 141. The memories 144 and 130 may be of any type capable of storing information accessible by the processors 141 and 120, including a tangible computer-readable storage medium such as a hard-drive, memory card, ROM, RAM, DVD, CD-ROM or other optical disks, as well as other write-capable, and read-only memories. Memory 130 of computer 110 may include data 135 that may be retrieved, manipulated or stored by processor 141 via network 195. The processors 120 and 141 may be any well-known processors, such as processors from Intel Corporation or AMD. Alternatively, the processors may be dedicated controllers such as an ASIC.

The GAM 145 may include any set of instructions to be executed directly (such as machine code) or indirectly (such as scripts) by processor 141. In an alternate embodiment, GAM 145 may reside in memory 130 of computer 110 to be executed directly or indirectly by processor 120. The instructions may be stored as computer code on a computer-readable medium. In that regard, the terms "instructions," "steps" and "programs" may be used interchangeably herein. The instructions may be saved in object code format for direct processing by the processor, or in any other computer language including scripts or collections of independent source code modules that are interpreted on demand or compiled in advance. Functions, methods and routines of the instructions are explained in more detail below.

Although the systems and methods are not limited by any particular data structure, the data may be stored in computer registers, in a relational database as a table having a plurality of different fields and records, XML documents, etc. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processors and memories as being within the same respective blocks, it will be understood that the processors and memories may actually comprise multiple processors and memories that may or may not be stored within the same physical housing. For example, some of the instructions and data may be stored on a removable CD-ROM and others within a read-only computer chip. Some or all of the executable instructions of GAM 145 and data 135 may be stored in a location physically remote from, yet still accessible by either processor. If efficient processing of large scale data is needed, GAM 145 may be further divided into multiple modules spanning multiple computers. Accordingly, references to a processor or computer will be understood to include references to a collection of processors or computers that may or may not operate in parallel.

Client device 140 may be a personal computer, intended for use by a person 191, having all the internal components normally found in a personal computer such as a central processing unit (processor 141), display device 142 (for example, a monitor having a screen, a projector, a touch-screen, a small LCD screen, a television, or another device such as an electrical device that is operable to display information processed by the processor), a computer-readable medium (for example, a CD-ROM, hard-drive, RAM or ROM), such as memory 144, user input 143 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, and network computers lacking local storage capability.

Although the client device 140 may comprise a full-sized personal computer, the systems and methods may also be used in connection with mobile devices capable of wirelessly exchanging data with a server over a network such as the Internet. For example, client device 140 may be a wireless-enabled PDA such as a Blackberry phone, an Internet-capable cellular phone, a notebook, or a tablet pc. The user may input information using a small keyboard, a keypad, a touch screen, or any other means of user input.

Computer 110 and client device 140 are capable of direct and indirect communication, such as over a network 195. Although only a few computers are depicted in FIGS. 1-2, it should be appreciated that a system may include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

In one aspect, computer 110 may be a data server communicating with one or more computers linked to the network 195. The computer 110 may store a business listings database 136 and a point of interest ("POI") database 137. The data contained within these databases may be served to a client device 140 based on requests in the instructions of GAM 145. The address information and map coordinates, such as latitude and longitude coordinates, of the business listings and POIs may also be stored in business listings database 136 and POI database 137, respectively.

Figure 3:
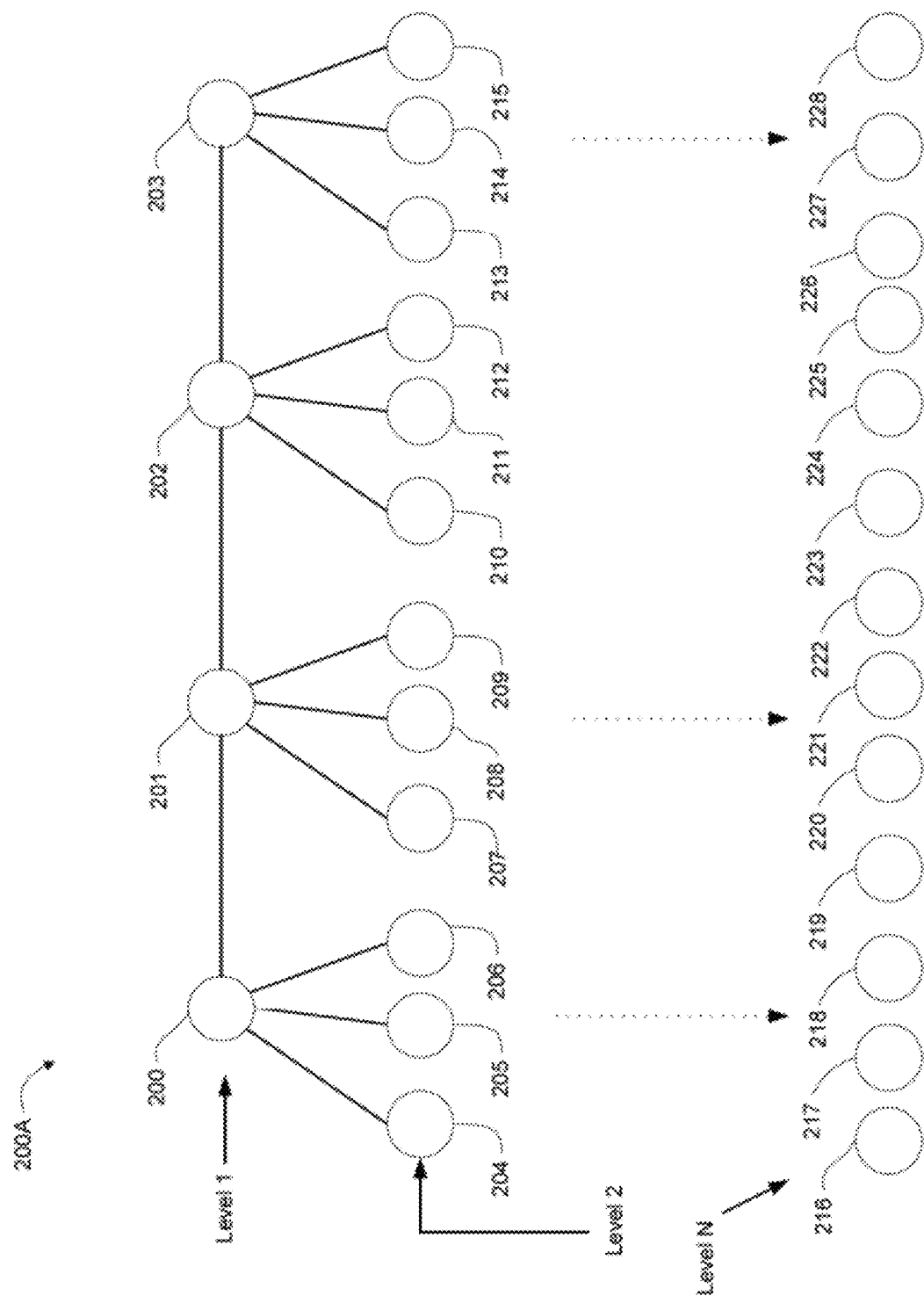
FIG. 3 is a data model in accordance with an aspect of the invention.

Computer 110 may also store a spatial index 138. Spatial index 138 may be a database of geographic or geospatial information for all areas. The spatial index may be modeled in a variety of ways. FIG. 3 illustrates an exemplary embodiment of the spatial index 138. Some or all areas on the Earth's surface may be divided into cells that are contained in a hierarchy of nodes or indices. Each level of the hierarchy may represent a different zoom level of a geographic area. For example, FIG. 3 shows level 1 of the hierarchy 200A having indices 200-203. Each level 1 index may represent a different perspective of the earth's surface as seen from space (e.g., western hemisphere, eastern hemisphere, arctic region, etc.). Each index 200-203 in the first level may have three child indices 204-206, 207-209, 210-212, and 213-215 respectively. Each child index 204-215 may have a zoom level that is narrower than the index of the previous level. This subdivision may be repeated as necessary until reaching an Nth level, which is illustrated in FIG. 3 as having indices 216-228. Each level may represent progressively narrower and more precise areas or zoom levels of the earth's surface. At each successive layer, the cells within the nodes may decrease in size and increase in number, which increases the zoom level and the accuracy of the area represented. In one embodiment, if a given cell intersects a known coordinate (e.g., a latitude/longitude coordinate), the cell may not be further subdivided.

Figure 4:
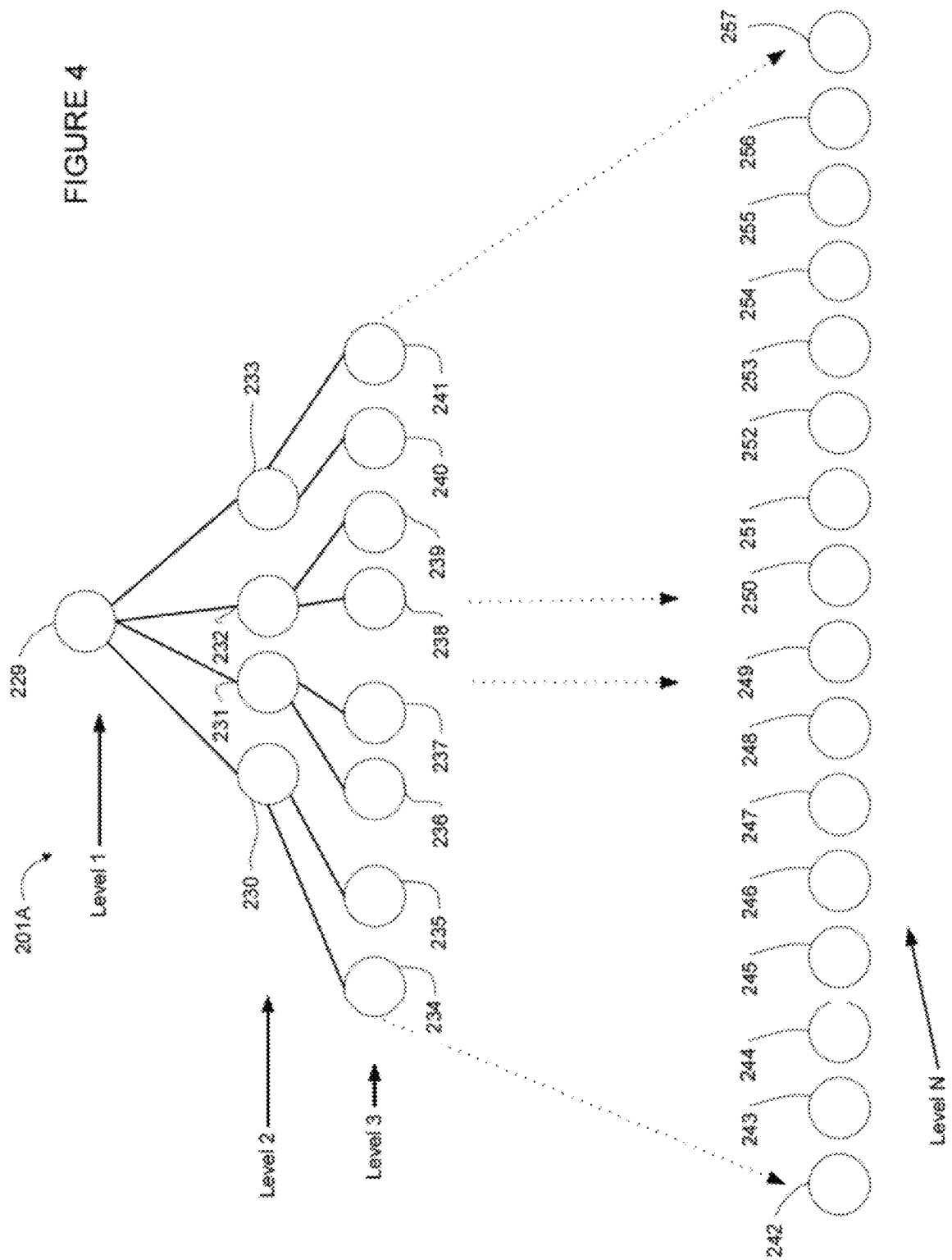
FIG. 4 is an alternate data model in accordance with an aspect of the invention.

The data of the spatial index 138 may also be arranged as a tree 201A of indices as shown in FIG. 4. Here, level 1 is a root index 229. Level 1 may represent the broadest area (e.g., a continent, a country, a hemisphere etc.) and the leaf nodes or level N may represent the narrowest area (e.g., a street, a block, a neighborhood, a city. etc.). Any number of intermediate layers may be implemented. FIG. 4 shows the root index 229 at level 1. At level 2, four child indices 230-233 are shown. Each of the four child indices of level 2 may represent a quarter of the area represented by the root index 229 at level 1, however with more detail and more precision. Level 3 shows two child indices 234-235, 236-237, 238-239, and 240-241 spawning from each of the indices of level 2. As with level 1, each node of level 2 may represent a sub area of the indices of level 2 with more precision.

Figure 5:
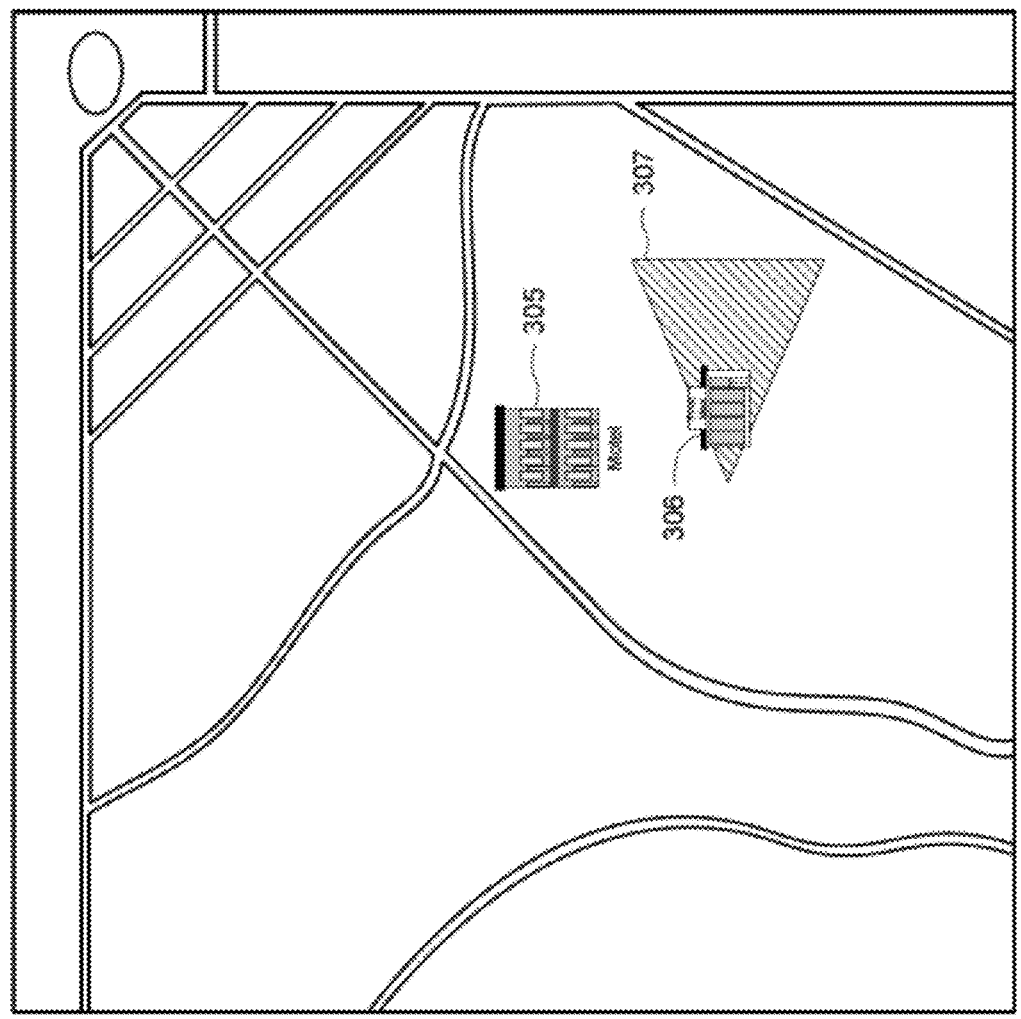
FIG. 5 is an exemplary map in accordance with an aspect of the invention.
Figure 5:

FIG. 5 is an example of an area 300 on a map that may be represented by an index at a predetermined level of the spatial index hierarchy. FIG. 5 shows a motel 305, a convenience store 306, and a park 307. The geospatial coordinates (e.g., latitude and longitude coordinates) of the motel 305 and the convenience store 306 may be stored in business listings database 136. The geospatial coordinates of the park 307 may be stored in POI database 137. Alternatively, all the geospatial information may reside in one database. It should be understood that the data may be structured in a variety of ways. In the example of FIG. 5, convenience store 306 is shown positioned within park 307. While this may be the accurate physical location of convenience store 306, it may also be a data entry error or a deliberate attempt by an advertiser to promote the convenience store 306 by using the same address as a well known POI.

Figure 6:
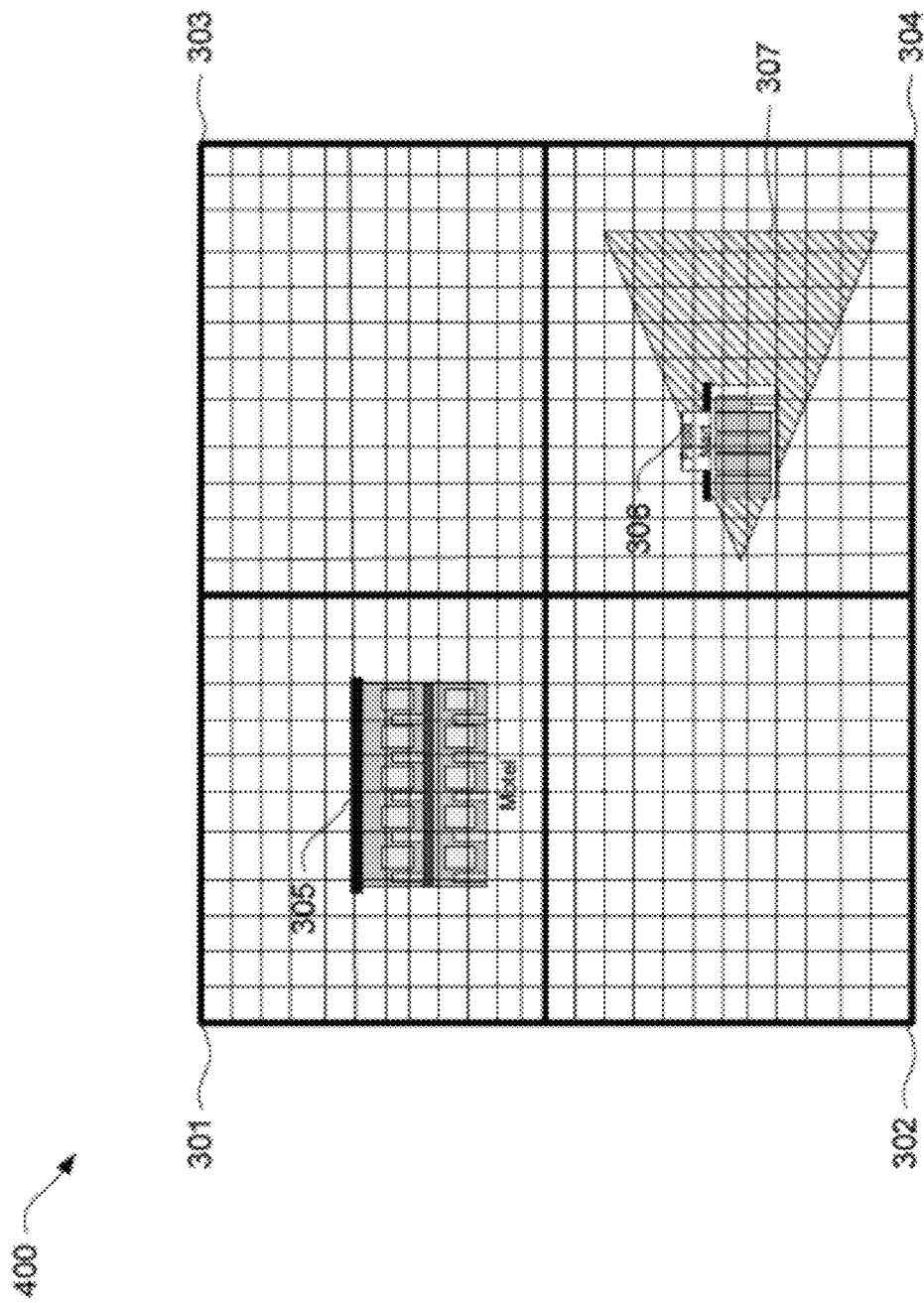
FIG. 6 is a diagram in accordance with an aspect of the invention.
Figure 7:
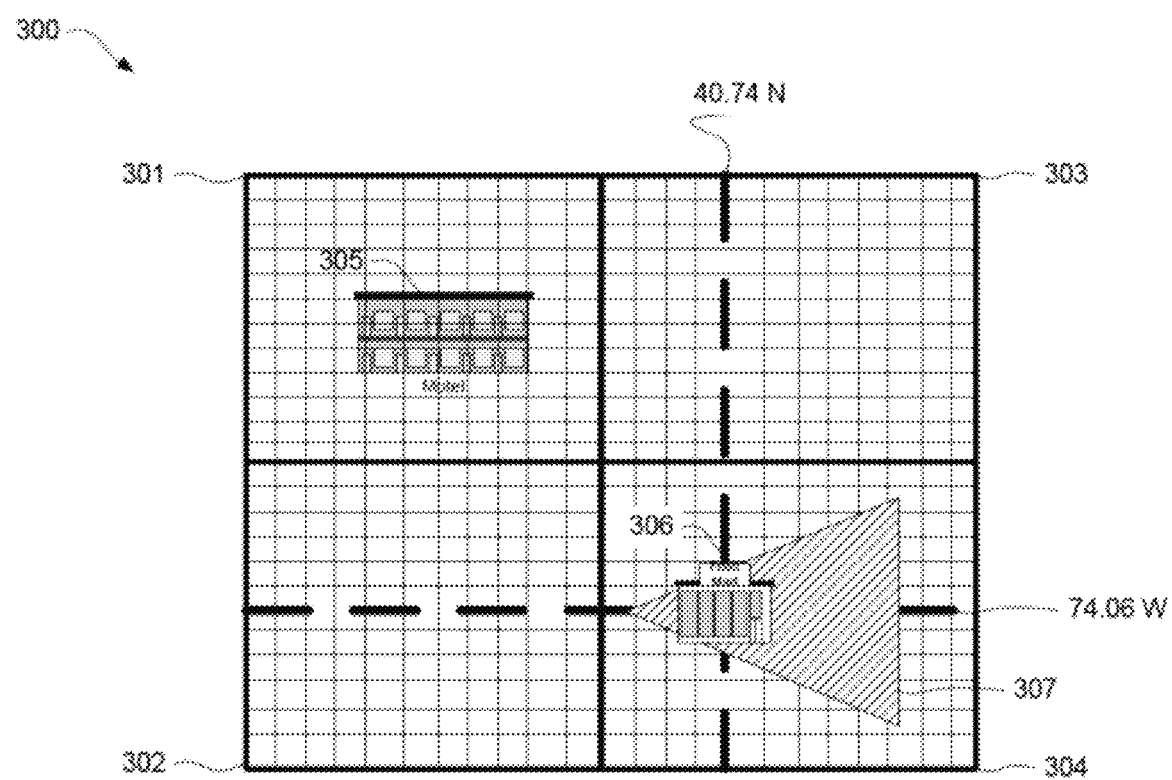
FIG. 7 is another diagram in accordance with an aspect of the invention.
Figure 8:
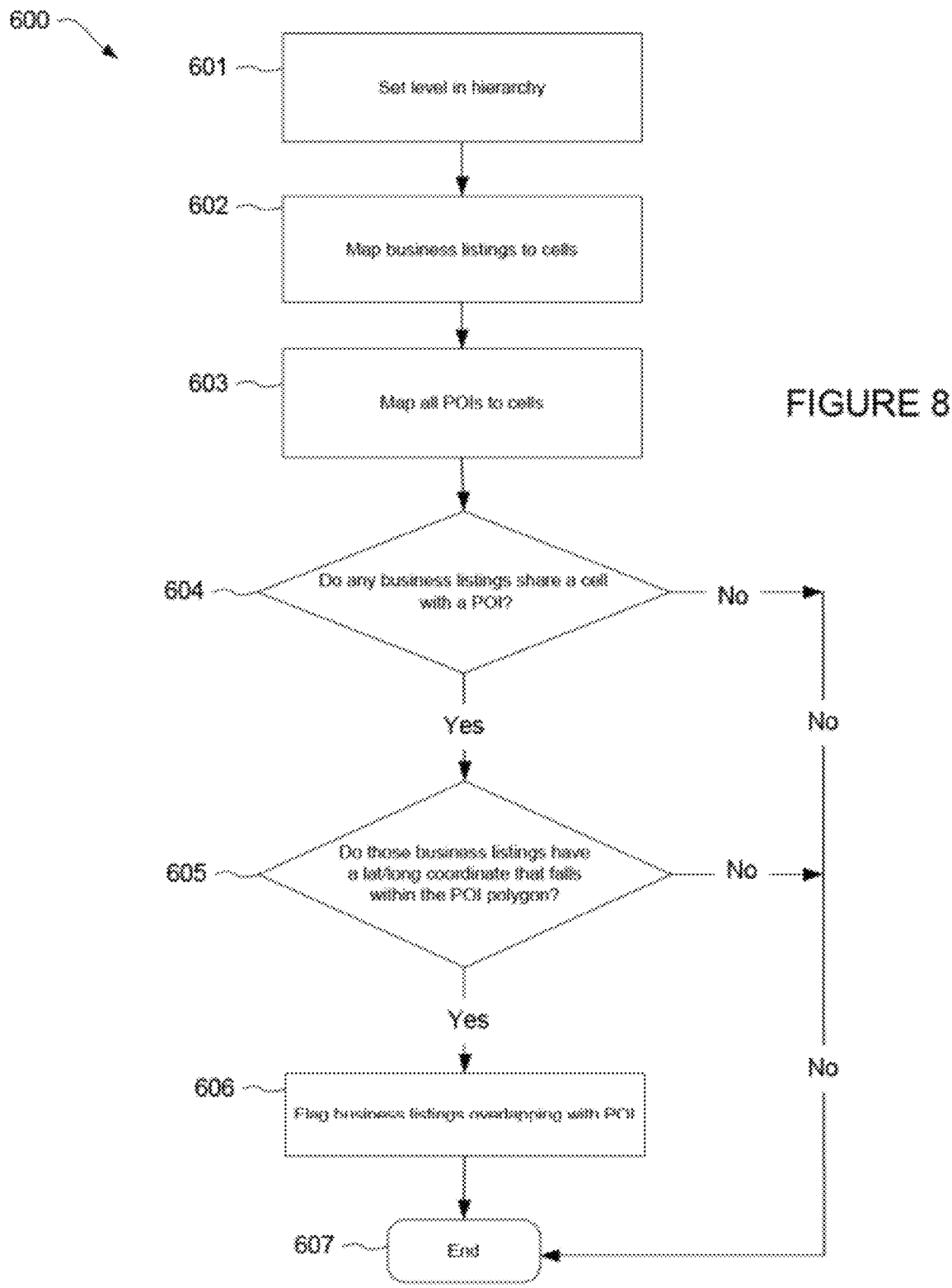
FIG. 8 is a flowchart in accordance with an aspect of the invention.

FIGS. 6-7 are close up illustrations of an area 400 encompassing convenience store 306, park 307, and motel 305. Each of the business listings 305-306 and the park 307 may be mapped to cells 301-304, each of which may be located in an index at a predetermined level of the hierarchy (e.g., level N). A cell may encompass a certain square footage within each index.

The processor 120 or 141 may employ GAM 145 to determine if any of the businesses share a cell with a point of interest. If a business does share a cell with a point of interest, GAM 145 may retrieve latitude/longitude coordinate information of the point of interest and the accompanying business. In the example of FIG. 7, GAM 145 may retrieve the latitude/longitude coordinate information of convenience store 306 from business listings database 136 and park 307 from POI database 137. Motel 305 may be ignored because it does not share a cell with a POI. Next, GAM 145 may determine if the latitude/longitude coordinates of convenience store 306 are within the polygon representing park 307. The polygon representing park 307 may also have at least one set of latitude/longitude coordinates. In FIG. 7, convenience store 306 is shown having a latitude of 40.74 N and a longitude of 74.06 W, which falls within the polygon of park 307. Thus, GAM 145 may flag convenience store 306 in order to prioritize the entry for further inspection. This may include a subsequent manual inspection. Any conventional flagging method may be employed (e.g., configuration file, registry, Boolean field, etc.).

In addition to the operations illustrated in the foregoing figures, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the foregoing figures are for the purposes of illustration only. In that regard, systems and methods in accordance with aspects of the invention may include different data values, types and configurations, and may be provided and received at different times and by different entities (e.g., some values may be pre-suggested or provided from different sources).

FIG. 9 illustrates a method 600 that may be executed by processor 141 in accordance with the instructions of GAM 145. In block 601, processor 141 may set the level within the hierarchy of the spatial index 138. The chosen level may encompass a particular area at a predetermined zoom level. In block 602, processor 141 may map the business listings falling within a relevant area to the coinciding cells within the spatial index 138. Processor 141 may retrieve the business listings from business listings database 136. The relevant area may be any area requested by, for example, a user using client device 140. In block 603, processor 141 may map POIs falling within the relevant area to the coinciding cells within the spatial index 138. Processor 141 may retrieve the POI data from POI database 137.

In block 604, processor 141 determines if any business listing within the relevant area is at least partially mapped to the same cell as a POI. The POI may also be at least partially mapped to the cell. If any business listing within the relevant area is at least partially mapped to the same cell as a POI, processor 141 may determine if the latitude and longitude coordinates of those business listings fall within a point of interest polygon in block 605. If the latitude and longitude coordinates of those business listings fall within a point of interest polygon, processor 141 flags those business listings in block 606. The flag may be stored by way of a field in a database or in memory. This may be followed by an alert to an administrator who may subsequently inspect the business listing manually. In block 607, processor 141 terminates the GAM 145 module.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for detecting a business listing having erroneous geospatial data, the method comprising:
   obtaining, using a processor, data indicative of the business listing associated with a first location;
   determining, using a processor, whether the first location and a second location are at least partially situated within a cell representing a geographic region having a predetermined area, the second location being associated with a listing of a locality, the listing being recognized as valid;
   if the first location and the second location are at least partially situated within the cell, determining, using a processor, whether a geospatial coordinate of the first location is within a predetermined radius of the second location; and
   if it is determined that the geospatial coordinate of the first location is within the predetermined radius of the second location, flagging, using a processor, the first location for inspection.

2. The method of claim 1, wherein the locality is a point of interest.

3. The method of claim 1, wherein if it is determined that the geospatial coordinate of the first location is within the predetermined radius of the second location, the method further comprises rendering on an electronic display, using a processor, an alert indicating that erroneous geospatial data may have been detected.

4. The method of claim 1, wherein if it is determined that the first location is at least partially located within the geographic region represented by the cell, the method further comprises associating, using a processor, the first location with the cell.

5. The method of claim 1, wherein if it is determined that the second location is at least partially located within the geographic region represented by the cell, the method further comprises associating, using a processor, the second location with the cell.

6. The method of claim 1, wherein the predetermined area corresponds with a predetermined level of precision.

7. The method of claim 6, wherein the cell is one of a plurality of cells, each of the plurality of cells representing another geographic region whose area corresponds with the predetermined level of precision.

8. A system for detecting a business listing having erroneous geospatial data, the system comprising:
   a processor;
   memory for storing business listings data;
   memory for storing point of interest data; and
   memory for storing spatial index data;
   wherein the processor is coupled to the memory for storing business listings data, the memory for storing point of interest data, and the memory for storing spatial index data, the processor being configured:
   to obtain data indicative of the business listing associated with a first location;
   to determine whether the first location and a second location are at least partially situated within a cell representing a geographic region having a predetermined area, the second location being associated with a listing of a locality, the listing being recognized as valid;
   if the first location and the second location are at least partially situated within the cell, to determine whether a geospatial coordinate of the first location is within a predetermined radius of the second location; and
   if it is determined that the geospatial coordinate of the first location is within the predetermined radius of the second location, to flag the first location for inspection.

9. The system of claim 8, wherein the locality is a point of interest.

10. The system of claim 8, wherein if it is determined that the geospatial coordinate of the first location is within the predetermined radius of the second location, the processor further renders an alert on an electronic display indicating that erroneous geospatial data may have been detected.

11. The system of claim 8, wherein if it is determined that the first location is at least partially located within the geographic region represented by the cell, the processor associates the first location with the cell.

12. The system of claim 8, wherein if it is determined that the second location is at least partially located within the geographic region represented by the cell, the processor associates the second location with the cell.

13. The system of claim 8, wherein the predetermined area corresponds to a predetermined level of precision.

14. The system of claim 13, wherein the cell is one of a plurality of cells, each of the plurality of cells representing another geographic region whose area corresponds to the predetermined level of precision.

\* \* \* \* \*